United States Patent

Sheppard et al.

[11] 3,976,569
[45] Aug. 24, 1976

[54] WATER SOFTENING PROCESS

[75] Inventors: John D. Sheppard; David G. Thomas, both of Oak Ridge, Tenn.

[73] Assignee: The United States of America as represented by the United States Energy Research and Development Administration, Washington, D.C.

[22] Filed: Feb. 25, 1975

[21] Appl. No.: 553,048

[52] U.S. Cl. ............................... 210/23 F; 210/47; 210/53; 210/75
[51] Int. Cl.² ........................................ B01D 13/00
[58] Field of Search ............... 210/20, 23 H, 23 F, 210/42, 46, 47, 51–53, 59, 60, 75, 193, 321 R

[56] References Cited
UNITED STATES PATENTS

| | | | |
|---|---|---|---|
| 3,037,632 | 6/1962 | Du Jardin | 210/193 |
| 3,259,717 | 10/1941 | Zentner | 210/46 |
| 3,462,362 | 8/1969 | Kollsman | 210/321 R |
| 3,577,339 | 5/1971 | Baird et al. | 210/75 |
| 3,733,265 | 5/1973 | Kraus et al. | 210/51 |
| 3,743,595 | 7/1973 | Johnson | 210/23 H |
| 3,778,366 | 12/1973 | Kraus | 210/23 H |
| 3,835,040 | 9/1974 | Mahlman et al. | 210/51 |
| 3,839,199 | 10/1974 | Weiss et al. | 210/20 |

*Primary Examiner*—Charles N. Hart
*Assistant Examiner*—Peter A. Hruskoci
*Attorney, Agent, or Firm*—Dean E. Carlson; David S. Zachry; Irving Barrack

[57] ABSTRACT

This invention involves an improved process for softening hard water which comprises selectively precipitating $CaCO_3$ to form a thin layer thereof, increasing the pH of said water to precipitate magnesium as magnesium hydroxide and then filtering the resultant slurry through said layer. The $CaCO_3$ layer serves as a thin permeable layer which has particularly useful application in cross-flow filtration applications.

4 Claims, 1 Drawing Figure

VARIATION IN FEED pH AND PRODUCT FLUX WITH RUN TIME DURING CROSSFLOW FILTRATION

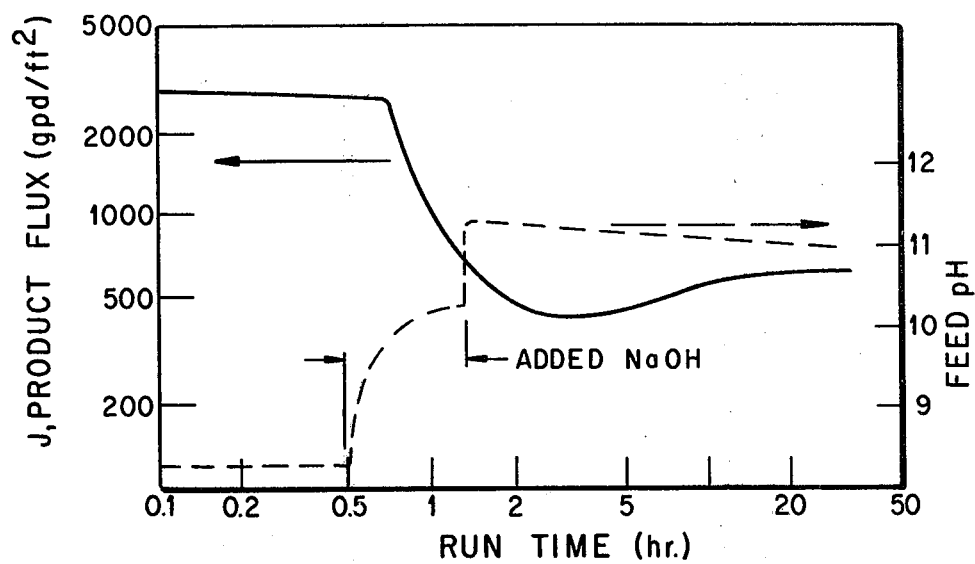
VARIATION IN FEED pH AND PRODUCT FLUX WITH RUN TIME DURING CROSSFLOW FILTRATION

WATER SOFTENING PROCESS

The invention described herein was made in the course of, or under, a contract with the United States Atomic Energy Commission.

BACKGROUND OF THE INVENTION

The present invention relates to an improved method of softening water hardness caused by $CaCO_3$ and $Mg(OH)_2$. More particularly, it relates to a process for treating effluents of filtrates resulting from the lime-soda method to low levels of total hardness of the order 10 ppm as $CaCO_3$ or less.

In the lime-soda method for softening water, slaked lime $Ca(OH)_2$, is added to hard water to convert water soluble calcium and magnesium bicarbonate to water insoluble calcium carbonate and magnesium hydroxide. Resulting filtrates contain levels of hardness which prevent efficient further treatment of the water by hyperfiltration processes to reduce total salinity, for example, as described in U.S. Pat. No. 3,743,595. Studies have shown that desalination of hard brackish waters by hyperfiltration with dynamic membranes does not proceed efficiently and for these hyperfiltration processes the hardness of feed waters should not exceed more than 10 ppm total hardness. (The degree of total hardness in water, no matter to what compounds it may be due, is expressed in terms of calcium carbonate, $CaCO_3$.)

A particularly convenient way of conducting filtration of lime-soda filtrates to produce a product water having the required low level of total hardness is achievable by the process of crossflow filtration. However, a technically and economically competitive cross-flow filtration process must provide a filtration flux of at least 200 and preferably 300 gallons per square foot of filtration surface area per day, gal/ft²-day.

It is, accordingly, a principal object of this invention to provide a process which produces a product water suitable for further treatment by hyperfiltration or for any other application requiring a low hardness feed. More particularly, it is an object of this invention to provide a filtration process capable of providing a water product containing no more than 10 ppm total hardness at a production level of at least 200 gallons per square foot of filtration surface area per day. A further object is to provide an improved cross-flow filtration process capable of realizing the aforementioned objects. Attainment of these and other objects will become apparent from the ensuing description in which the accompanying FIGURE is a graph which shows the relationship between product flux and pH in the course of a cross-flow filtration test and the relationship of these two parameters as a function of run time.

SUMMARY OF THE INVENTION

The present invention is predicated on the discovery that in the first instance that a precipitated layer of $CaCO_3$ serves as an effective permeable filtration layer through which aqueous feeds can be passed to produce satisfactorily low levels of hardness at suitably high product fluxes. The gist of the invention involves a pH-controlled selective precipitation of $CaCO_3$ from a hard water feed sufficient to form a permeable filtration layer on a porous substrate, and then raising the pH to precipitate remaining calcium values as well as $Mg(OH)_2$. Selective precipitation of $CaCO_3$ and then passing the pH-adjusted feed tangentially across said filter layer of $CaCO_3$ at a sufficient pressure and velocity results in a low hardness, clarified filtrate collected on an opposite face of said porous substrate which can be processed by hyperfiltration techniques to effect desalting.

In cross-flow filtration, a liquid feed is flowed tangentially past a filtering surface. Operationally, it involves pumping feed through a porous pipe or tube support substrate upon which is deposited a thin permeable layer of finer porosity than that of the support substrate. Feed water passes across the permeable deposited layer and across the tube wall to be collected as a filtered product on the opposite side of the tube. A fairly wide variety of porous tubular substrate elements may be used including porous ceramic, carbon, metal, or plaster tubes or screens. A particularly convenient class of materials is woven tubular fabrics made similar to fire hose jackets. Such flexible forms of filter generally require support when pressurized feed is applied from the outside and product is collected within the tube. Reinforcement is not required where feed is pumped through the tube and product collected as it forms across a thin permeable filter layer deposited in the internal surface of the tube and thence across the tube wall. The thin permeable layer of $CaCO_3$ used in the present invention may be predeposited on the feed side or deposited dynamically from the feed solution.

According to the present invention, an effective filtration membrane is dynamically formed by selective precipitation of $CaCO_3$ from a hard water feed by adjusting or maintaining the feed at a pH in the range 8 to 10 at a temperature in the range 15° to 35°C. Under these conditions a permeable filtration layer consisting essentially of $CaCo_3$ is selectively precipitated and deposited on the surface of the selected tubular substrate. To remove the remaining total hardness, the feed pH is then adjusted to the range 10.8 to 11.5 to precipitate additional $CaCO_3$ and the Mg as $Mg(OH)_2$ to produce a water product containing less than 10 ppm total hardness. Satisfactory product fluxes are obtained at a cross-flow velocity ranging from 3 to 35 ft/sec at feed pressures in the range 15 to 70 psig. The velocity should not be as low as to allow build-up of an excess amount of $CaCO_3$ but not so high as to shear off the effective filtration layer of $CaCO_3$, generally thought to amount to no more than a few microns in thickness.

The following examples illustrate representative embodiments of how to use the invention and provide tangible evidence of the advantages resulting therefrom.

The process of the present invention is a modified form of the classically well-known lime-soda process for softening hard water coupled with cross-flow filtration. A principal feed source for the present invention is derived from the conventional lime-soda process where hardness on a large scale is removed by addition of slaked lime in large tanks. Precipitated hardness is allowed to settle. The resultant overlaying dilute solution or slurry or filtrate can serve as feed for the improved cross-flow filtration process of the invention. Feed hardness as high as 5000 ppm has been processed by the present invention.

EXAMPLE I

A synthetically prepared hard brackish water feed was prepared to the following composition in mg/l: Na, 465; Ca, 160; Mg 5.1; Cl, 710; $SO_4^=$, 391; $HCO_3^-$, 229;

and Fe, .02, total hardness 610. The feed was raised to a pH of about 12, by addition of NaOH to convert the bicarbonate to carbonate for precipitation of part of the feed calcium and provide hydroxyl ion for magnesium precipitation. Then $CO_2$ was added to complete precipitation of Ca. The reactions involved may be represented as follows:

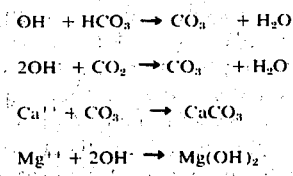

$$OH^- + HCO_3^- \rightarrow CO_3^= + H_2O$$

$$2OH^- + CO_2 \rightarrow CO_3^= + H_2O$$

$$Ca^{++} + CO_3^= \rightarrow CaCO_3$$

$$Mg^{++} + 2OH^- \rightarrow Mg(OH)_2$$

The slurry from the thus treated solution was filtered in a cross-flow filtration loop consisting of a length of nominal 1-inch diameter nylon polyester fire hose jacket having a filtration area of 0.83 ft². Feed was circulated through the hose and a water product collected as the water transpired through the jacket. The table below summarizes the results of this treatment as run 1 with four subsequent runs repeated under defined conditions.

TABLE

Cross-Flow Filtration of Calcium and Magnesium Precipitates From Synthetic Hard Water Feed (~30°C;, Initial Feed Hardness: ~720 ppm Total Hardness as $CaCO_3$, 480 ppm Calcium as $CaCO_3$)

| Run No. | Run Time (hr) | Feed Velocity (ft/sec) | Inlet Pressure (psig) | Product Flux (gpd) | Total Hardness (ppm $CaCO_3$) | pH |
|---|---|---|---|---|---|---|
| 1 | 0.3 | 4.1 | 26 | 89 | 9 | 10.8 |
|  | 19 | 4.1 | 26 | 69 | 16 | 11.7 |
| 2 | 1.2 | 5.8 | 51 | 121 | 9 | 11.4 |
|  | 5.7 | 5.8 | 51 | 114 | 9 | 11.4 |
|  | 20.5 | 5.8 | 51 | 96 | 100 | 10.3<sup>a</sup> |
| 3 | 1.0 | 6 | 54 | 90 | 4 | 11.5 |
|  | 6.5 | 6 | 54 | 89 |  | 11.1 |
| 4 | 1.2 | 3.4 | 15 | 2070<sup>b</sup> | 246<sup>b</sup> | 9.9<sup>b</sup> |
|  | 20.5 | 3.4 | 15 | 1130 | 346 | 8.4 |
| 5 | 0.6 | 6.7 | 70 | 813 | 12 | 11 |
|  | 7.6 | 6.7 | 70 | 835 | 9 | 10.8 |
|  | 22.8 | 6.7 | 70 | 350 | 48 | 10.3<sup>a</sup> |

<sup>a</sup>pH decrease during overnight operation.
<sup>b</sup>Treatment for calcium removal, only 8 ppm $Ca^{++}$ in product.

In the first run, with a modest cross-flow velocity of only 4 ft/sec, the product flux averaged 79 gallons per day over 19 hours. Of particular significance is the low-level average product hardness of only 9–16 ppm as compared to 30–40 ppm hardness obtained by conventional water softening techniques employing sand filtration or sedimentation, or by hot lime-soda operation. Run 2 was operated at slightly higher velocity and nearly doubled pressure; flux was somewhat higher and product hardness was 9 ppm for several hours increasing only with a decrease in pH. Run 3 conditions were similar to those of run 2 with product hardness as low as 4 ppm. Runs 4 and 5 illustrate the invention. In run 4, the pH of the feed was held between 8 and 10 to solubilize Mg and precipitate calcium only. Here cross-flow filtration at a velocity of 3.4 ft/sec and 15 psig inlet pressure resulted in a dramatic increase in product flux; the total hardness of 246–346 ppm reflected primarily the magnesium contribution to the total hardness and included only 8 ppm $Ca^{++}$. The final (5th) run illustrates the best mode of operating the invention. In this case, the pH was raised high enough (10.8 to 11) to precipitate magnesium. When this feed was circulated through the hose containing a precoated layer of $CaCO_3$ from previous run 4, an average product flux of over 500 gpd/ft² was attained at satisfactorily low hardness levels. After the start up transient during which product hardness decreased to less than 10 ppm, product hardness remained at this low level for several hours until decreased feed pH resulted in solubilizing some magnesium.

Viewing the overall results and comparing the runs, it is seen that selective precipitation of $CaCO_3$, as in run 4, apparently develops a condition of permeability sufficient to allow attainment of high product fluxes; subsequent precipitation of $Mg(OH)_2$ does not adversely affect filtration product flux. In cases where calcium and magnesium were simultaneously precipitated (as in runs 1–3), product flux was unsatisfactorily low although the product hardness level was generally acceptable.

The low product fluxes are attributable to the relatively nonpermeable gelationous $Mg(OH)_2$. Yet, surprisingly, the $Mg(OH)_2$ does not appear to interfere with obtaining satisfactorily high product fluxes when a precoat of $CaCO_3$ is laid down.

The brackish water products from the runs shown in the table were used as feed to test their behavior as feed for treatment by hyperfiltration in accordance with general procedures described in U.S. Pat. No. 3,743,595. Specifically, the effect of the different treatments in the performance of a Zr IV-polyacrylic acid dual layer hyperfiltration membrane was studied. After formation of the dual layer a base line of performance with 0.058M NaCl with no calcium or magnesium was established during 140 hours of operation at 1000 psig. Chloride rejection was 92% at a flux of 90 gpd/ft². When feed was switched to pretreated brackish water with 8 ppm total hardness (run 4) the product flux was essentially unchanged, but the chloride rejection decreased from 92% to 80% and sulfate rejection increased slightly from 94% to 96%. Increasing the hardness level in the pretreated feed to 100 ppm resulted in increases in both chloride (80 to 88%) and sulfate (90 to 98%) rejection. However, the flux decreased from 90 to 30 gpd/ft². Use of an untreated synthetic hard water feed (970 ppm total hardness) resulted in decreases in chloride (~70%) as well as sulfate (82%) rejection and a sharp decrease in flux to about 17 gpd/ft². A summary of results shows that maintenance of favorable hyperfiltration performance both in terms of flux and ion rejection requires feed with no more than 10 ppm total hardness.

EXAMPLE II

In this example cross-flow filtration studies were made using an 18-foot long section of 1-inch diameter fire hose jacket having a filter surface area of about 4.5 ft$^2$. The hose was pretreated by placing in a dilute hydrochloric acid solution (pH 2–5) followed by demineralized water in order to dissolve and flush out residual $CaCO_3$ and $Mg(OH)_2$ from previous runs. A brackish water feed (1130 ppm total hardness, 840 ppm calcium hardness) pressurized to 35 psig was circulated through the fire hose jacket at 35°C at a velocity of 16 ft/sec at an initial feed pH of ~8.4 for a period of 0.5 hour to deposit precipitated $CaCO_3$. The pH of the feed was then raised to 11.3 for the remainder of the filtration run. The FIGURE shows a product flux, feed pH profile as a function of time. Of the 840 ppm initial calcium hardness no more than 100 ppm was in solution at pH 8.4, the remainder having been precipitated and deposited as a smooth layer of $CaCO_3$ on the internal surface of the fire hose jacket. After 0.5 hour the pH was increased over a 1.5 hour period to a final pH of 11.4. At pH 10, the flux was still as high as 2700 gal/ft$^2$/day, but decreased steadily until it stabilized at 600 gal/ft$^2$/day. At about 2 hours, after final feed adjustment, the total product hardness was less than 5 ppm.

It will thus be seen that we have shown how a precipitated layer of $CaCO_3$ can serve as an effective filtration layer for use in cross-flow filtration applications. For achieving effective filtration of hard-water feeds in terms of desirably low product hardness and maximum product flux, the Ca is selectively precipitated while maintaining magnesium in solution. The novel use of $CaCO_3$ has the added virtue that it can be easily removed simply by flushing with an acid solution. Thus, in cases where excess buildup of $CaCO_3$ reduces flow and/or flux, a temporary flow of acidified solution will enable rejuvenation of subsequent deposition of a fresh $CaCO_3$ filtration layer in the manner hereinbefore described.

What is claimed is:

1. An improved process for softening hard water feed which comprises selectively precipitating $CaCO_3$ from said feed at a pH sufficient to deposit a permeable filtration layer consisting essentially of $CaCO_3$ on a porous substrate, while flowing said feed tangentially past said substrate increasing the pH of said feed to precipitate magnesium as magnesium hydroxide and then flowing the thus treated water tangentially past the deposited $CaCO_3$ at a velocity and pressure sufficient to effect transpiration of the water through said $CaCO_3$ and substrate to produce a transpired clarified water product.

2. An improved process for softening hard water feed which comprises adjusting said feed to a pH in the range 8 to 10 and a temperature in the range of 15° to 35°C while flowing said water tangentially past a surface of a tubular porous substrate to cause deposition of a permeable filtration layer consisting essentially of $CaCO_3$ on said surface, adjusting said feed to a pH in the range of 10.8 to 11.5 which effects precipitation of magnesium as $Mg(OH)_2$ and then flowing the thus treated water tangentially past said $CaCO_3$ layer at a velocity and pressure sufficient to collect a transpired clarified water product from an opposite surface of said substrate.

3. The method according to claim 2 in which the substrate is a woven fabric.

4. The method according to claim 2 in which the velocity of the feed water flowing past said permeable layer of $CaCO_3$ is from 3 to 35 ft/sec and is at a pressure of from 15 to 70 psig.

* * * * *